US012650212B2

(12) United States Patent
Kim et al.

(10) Patent No.: US 12,650,212 B2
(45) Date of Patent: Jun. 9, 2026

(54) MODULE LAMP AND VEHICLE INCLUDING MODULE LAMP

(71) Applicants: HYUNDAI MOTOR COMPANY, Seoul (KR); KIA CORPORATION, Seoul (KR)

(72) Inventors: Hwi Eon Kim, Hwaseong-si (KR); Jung Wook Lim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/076,728

(22) Filed: Mar. 11, 2025

(65) Prior Publication Data

US 2026/0110412 A1 Apr. 23, 2026

(30) Foreign Application Priority Data

Oct. 17, 2024 (KR) ........................ 10-2024-0142014

(51) Int. Cl.

| | |
|---|---|
| ***F21S 41/20*** | (2018.01) |
| ***F21S 45/47*** | (2018.01) |
| ***F21V 17/08*** | (2006.01) |
| ***F21V 29/76*** | (2015.01) |

(52) U.S. Cl.

CPC ............. *F21S 41/285* (2018.01); *F21S 45/47* (2018.01); *F21V 17/08* (2013.01); *F21V 29/763* (2015.01)

(58) Field of Classification Search

CPC ........ F21S 41/285; F21S 45/47; F21S 41/295; F21S 41/39; F21S 41/29; F21V 17/08; F21V 29/763; F21V 19/005; F21V 29/70; F21Y 2115/10

See application file for complete search history.

(56) References Cited

U.S. PATENT DOCUMENTS

2009/0207626 A1 8/2009 Kim

FOREIGN PATENT DOCUMENTS

| | | | | |
|---|---|---|---|---|
| CN | 101349388 A * | 1/2009 | ............ F21V 17/101 |
| EP | 2505910 A2 * | 10/2012 | .............. F21S 41/26 |
| KR | 2009-0088631 A | 8/2009 | |
| KR | 20120011690 A * | 2/2012 | ............ F21V 29/713 |
| KR | 10-2280184 B1 | 7/2021 | |
| WO | WO-2020100188 A1 * | 5/2020 | ............ F21V 29/503 |

OTHER PUBLICATIONS

Search English translation of KR-20120011690-A (Year: 2012).*
Search English translation of WO-2020100188-A1 (Year: 2020).*
Search English translation of EP-2505910-A2 (Year: 2012).*
Search English translation of CN-101349388-A (Year: 2009).*

* cited by examiner

*Primary Examiner* — Omar Rojas Cadima

(74) *Attorney, Agent, or Firm* — MCDONNELL BOEHNEN HULBERT & BERGHOFF LLP

(57) ABSTRACT

A module lamp includes a light source emitting light, a support portion supporting the light source, a circuit board provided between the light source and the support portion, and an optical lens allowing light emitted from the light source to pass therethough. The optical lens includes a coupling leg portion passing through the circuit board and the support portion.

10 Claims, 10 Drawing Sheets

MODULE LAMP AND VEHICLE INCLUDING MODULE LAMP

CROSS REFERENCE TO RELATED APPLICATIONS

This application claims benefit of priority to Korean Patent Application No. 10-2024-0142014 filed on Oct. 17, 2024 in the Korean Intellectual Property Office, the disclosure of which is incorporated herein by reference in its entirety.

BACKGROUND

1. Field

The present disclosure relates to a module lamp and a vehicle including the same.

2. Description of Related Art

Recently, in a headlamp for a vehicle, a semi-permanent and an improved light-emitting diode (LED) may be used. A lighting method for configuring a headlamp using a plurality of module lamps including a light emitting diode (LED) has been increasingly applied.

Aiming of each of the plurality of module lamps may be useful to irradiate light, using a matrix-type head lamp using the plurality of module lamps, as intended by a designer.

Here, aiming is intended to adjust an irradiation angle of an individually provided light source module such that a headlamp including a plurality of light source modules is oriented in a precise direction.

SUMMARY

Aspects of the present disclosure provide a module lamp capable of easily adjusting aiming, the module lamp disposed in various manners, and a vehicle including the same.

However, the aspects of the present disclosure are not limited to those set forth herein, and other aspects set forth herein will be more easily understood by those skilled in the art from the description below.

According to an aspect of the present disclosure, there is provided a module lamp including a light source emitting light, a support portion supporting the light source, a circuit board positioned between the light source and the support portion, and an optical lens configured to allow light emitted from the light source to pass therethough. The optical lens may include a coupling leg portion passing through the circuit board and the support portion.

Each of the circuit board and the support portion may have at least one coupling hole through which the coupling leg portion may pass.

A cross-section of the at least one coupling hole includes an adjustment gap, such that the cross-section of the at least one coupling hole is larger than a cross-section of the coupling leg portion.

The at least one coupling hole may include a first coupling hole provided in the support portion.

The at least one coupling hole may further include a second coupling hole provided in the circuit board.

The adjustment gap may be determined based on an adjustment threshold angle of the optical lens. The threshold angle may be a maximum inclination of the optical lens with respect to the support portion.

The optical lens and the light source may be provided as a plurality of optical lenes and a plurality of light sources, and are connected to the support portion and the circuit board.

The coupling leg portion, may have a rotation coupling portion rotatably connected to one of the support portion and the circuit board.

The circuit board may be positioned on one surface of the support portion, and a heat dissipation fin may be positioned on an other surface of the support portion.

The optical lens may include at least two optical lenses. The at least two optical lenses may include a first lens configured to adjust light emitted from the light source, and a second optical lens configured to adjust the light passing through the first lens.

The optical lens may include a body portion configured to allow the light to be incident from one side of the optical lens, the body portion configured to emit the light to an other side of the optical lens. The coupling leg portion may be provided at the one side of the body portion and configured to support the body portion.

A portion of the body portion may be bent at a predetermined angle.

According to another aspect of the present disclosure, there is provided a module lamp including a light source generating light, a circuit board connected to the light source and configured to transmit power or an electrical signal, a reflector reflecting light emitted from the light source, a first support portion supporting the light source, the circuit board, and the reflector, and a second support portion supporting the first support. The first support portion may include a coupling leg portion passing through a coupling hole of the second support portion.

The first support portion comprises a plurality of first support portions, and the second support portion may be configured to support the plurality of first support portions.

A cross-section of the at least one coupling hole includes an adjustment gap, such that the cross-section of the at least one coupling hole is larger than a cross-section of the coupling leg portion.

The adjustment gap may be determined based on an adjustment threshold angle of the first support portion. The threshold angle may be a maximum inclination of the second support portion with respect to the first support portion.

The coupling legs portion may have a rotation coupling portion rotatably connected to one of the support portion and the circuit board.

A heat dissipation fin may be positioned on a portion of the first support portion.

According to another aspect of the present disclosure, there is provided a vehicle may include a module lamp of one of the above-described aspects.

A module lamp according to an example embodiment of the present disclosure may easily adjust aiming.

In addition, the module lamp according to an example embodiment of the present disclosure may be disposed in various manners to irradiate light.

The effects of the present disclosure are not limited to those set forth herein, and other effects not set forth herein will be clearly recognized by those skilled in the art from the description below.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Various modifications may be made to the example embodiments. Here, the example embodiments are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component. The term "and/or" may include combinations of a plurality of related described items or any of a plurality of related described items.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this code, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as having an ideal or excessively formal meaning, unless otherwise defined herein.

Hereinafter, example embodiments of the present disclosure will be described in more detail with reference to the accompanying drawings.

Figure 1:
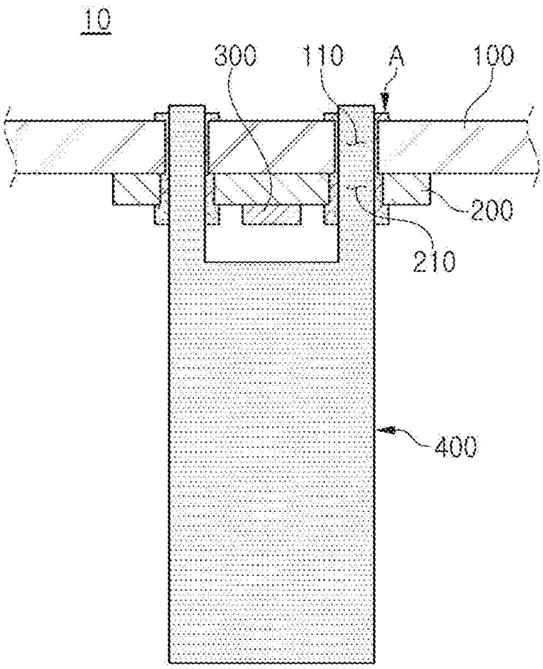
FIG. 1 is a cross-sectional view of a module lamp according to an example embodiment of the present disclosure.
Figure 2:
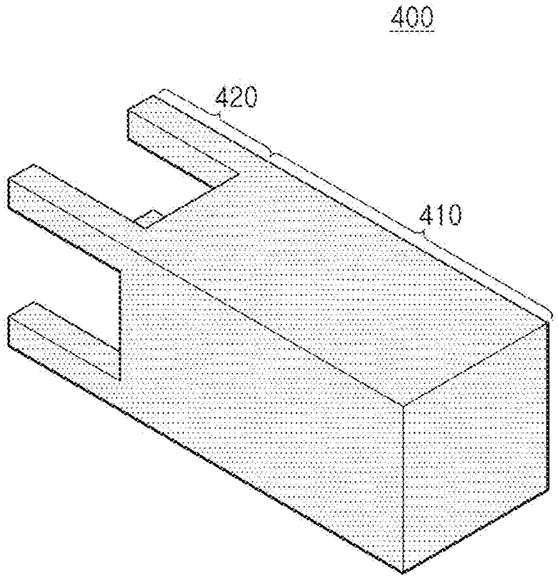
FIG. 2 is a perspective view of an optical lens according to an example embodiment of the present disclosure.
Figure 3:
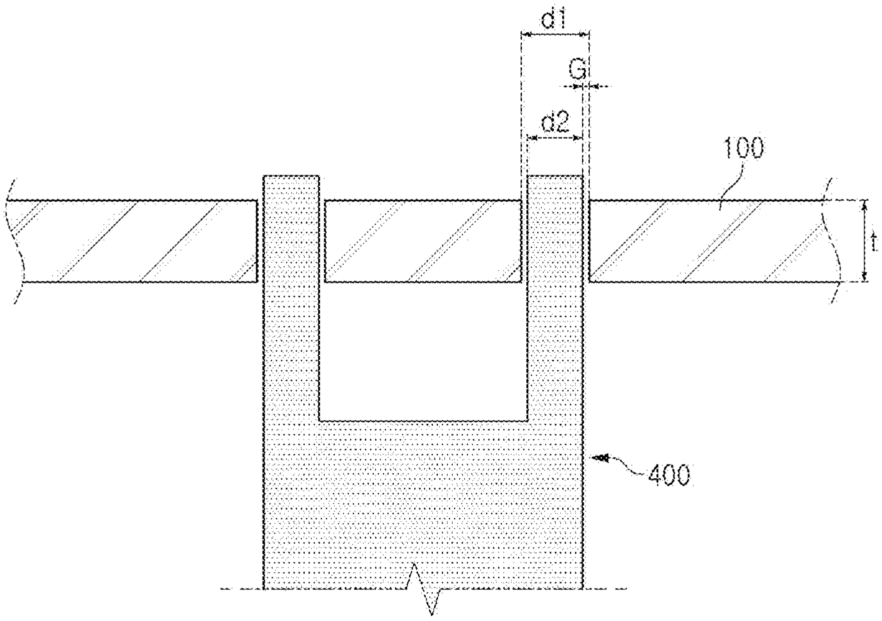
FIG. 3 is a view of a coupling portion between an optical lens and a base plate according to an example embodiment of the present disclosure.
Figure 4:
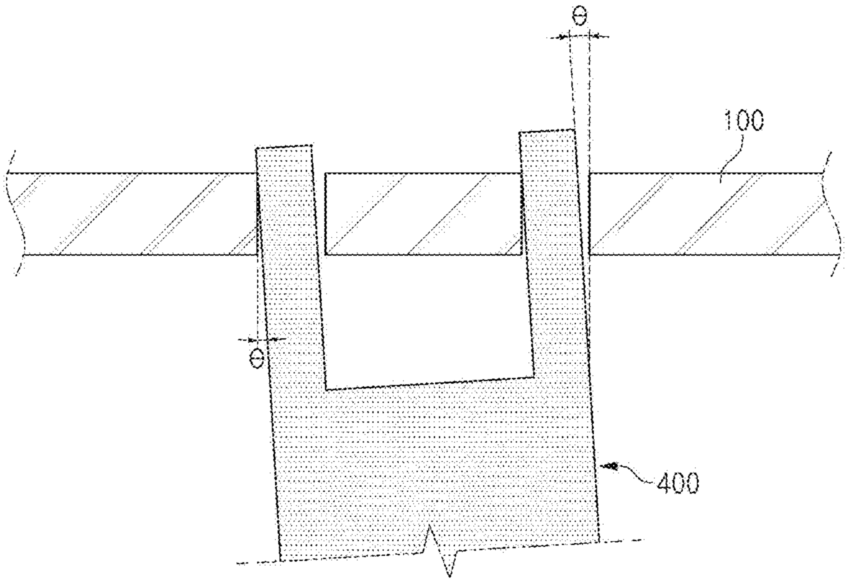
FIG. 4 is a view of a coupling portion between an optical lens and a base plate at a maximum adjustment angle for the optical lens according to an example embodiment of the present disclosure.
Figure 5:
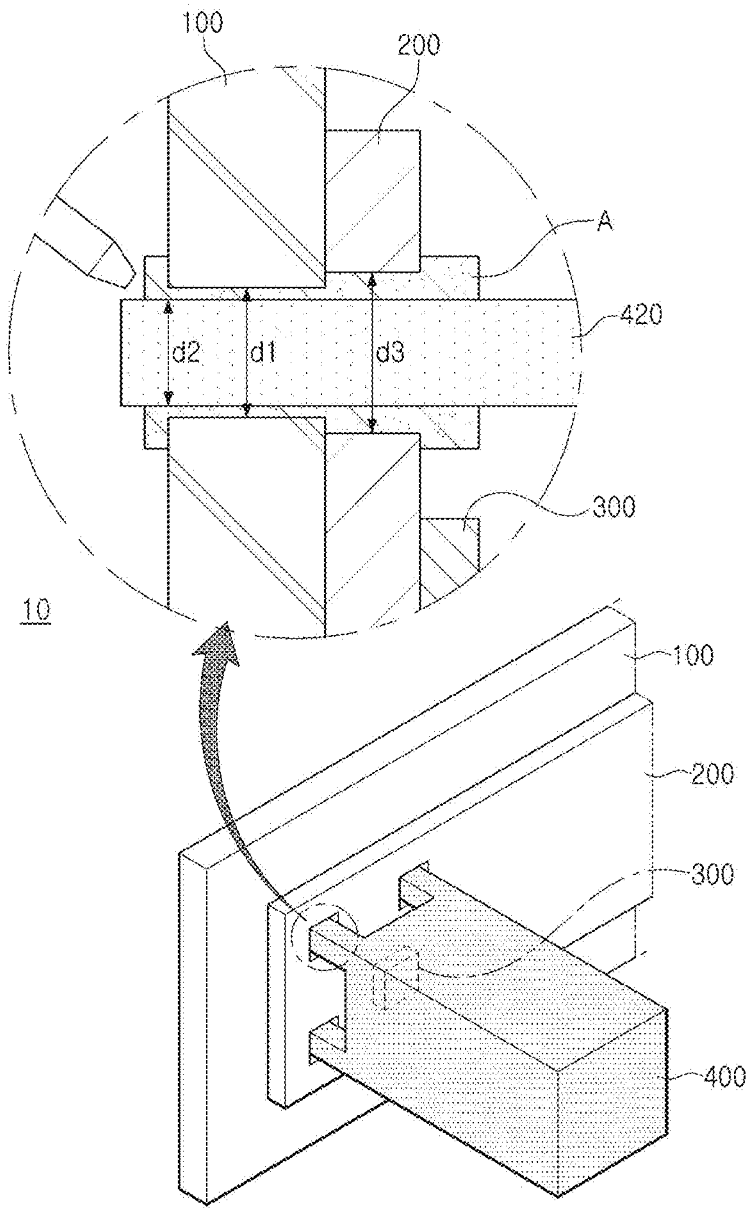
FIG. 5 is a perspective view of a module lamp according to an example embodiment of the present disclosure.

FIG. 1 is a cross-sectional view of a module lamp 10 according to an example embodiment of the present disclosure. FIG. 2 is a perspective view of an optical lens 400 according to an example embodiment of the present disclosure. FIG. 3 is a view of a coupling portion between the optical lens 400 and a base plate according to an example embodiment of the present disclosure. FIG. 4 is a view of a coupling portion between the optical lens 400 and a base plate at a maximum adjustment angle for the optical lens 400 according to an example embodiment of the present disclosure. FIG. 5 is a perspective view of the module lamp 10 according to an example embodiment of the present disclosure.

Referring to FIGS. 1 to 5, a module lamp 10 according to an example embodiment of the present disclosure may include a support portion 100, a circuit board 200, a light source 300, and an optical lens 400.

The support portion 100 may mechanically and structurally support the circuit board 200, the light source 300, and the optical lens 400 to be described below. The support portion 100 may be formed of metal or high-strength plastic.

The circuit board 200 may be supported by the support portion 100 to be in contact with one surface of the support portion 100. The circuit board 200 may be a board, supporting an electronic component and providing an electrical connection, and may be formed of several layers of a substrate, copper wiring, a solder mask, or the like. The circuit board 200 may be connected to the light source 300 to transmit an electrical signal and power to the light source 300.

The circuit board 200 may be a printed circuit board (PCB), a led array module (LAM), or the like.

The light source 300 may be a device connected to the circuit board 200 to emit light.

Here, the light source 300 may be a light source 300 that emits various light, such as a halogen light source 300, a high-intensity discharge (HID) light source 300, a xenon light source 300, a light-emitting diode (LED) light source 300, and a laser light source 300.

The optical lens 400 may be a component allowing light emitted from the light source 300 to be incident and emitting light, and may be a component refracting or reflecting incident light to emit incident light in a desired manner.

The optical lens 400 according to an example embodiment of the present disclosure may include a body portion 410 and a coupling leg portion 420.

The body portion 410 may support the coupling leg portion 420 to be described below and a light emitting portion, and may serve as a passage through which light incident from the light source 300 passes. The body portion 410 may have the coupling leg portion 420 at one side thereof, and the light emitting portion at the other side thereof.

The coupling leg portion 420 may protrude from the one side of the body portion 410 with a predetermined length. The coupling leg portion 420 may have a sufficient length to pass through at least the support portion 100 and the circuit board 200.

Referring to FIGS. 1 and 3 to 5, the support portion 100 of the optical lens 400 according to an example embodiment of the present disclosure may include a first coupling hole 110 through which the coupling leg portion 420 may pass.

Referring to FIG. 5, the first coupling hole 110 may be provided to be larger than the coupling leg portion 420.

The first coupling hole 110 may have a cross-sectional area, greater than that of the coupling leg 420, such that the coupling leg portion 420 may pass through the first coupling hole 110.

For example, a cross-sectional size of the first coupling hole 110 may be referred to as a first length d1, and a cross-sectional size of the coupling leg portion 420 may be referred to as a second length d2. The first length d1 may be provided to be greater than the second length d2.

Referring back to FIG. 3, the coupling leg portion 420 may be provided to have a predetermined adjustment gap G between the first coupling hole 110 and the coupling leg portion 420.

Referring to FIGS. 3 and 4, the optical lens 400 may be adjusted to an adjustment threshold angle θ within a limit of an adjustment gap G.

Here, the adjustment threshold angle θ may be a maximum adjustment angle of the optical lens 400, or a maximum angle at which the coupling leg portion of the optical lens 400 may be inclined with respect to the support portion 100.

In addition, the adjustment threshold angle θ may be determined in consideration of a variation in manufacturing.

Here, the variation in manufacturing may be a manufacturing tolerance in terms of a thickness, angle, and length of the support portion 100, a coupling hole or a coupling leg of the circuit board 200 or the like which may occur during a manufacturing process.

Referring to FIGS. 3 and 4, when the coupling leg portion 420, inserted into the first coupling hole 110, is provided in the middle of the first coupling hole 110, in other words, when the adjustment gaps G, formed at both sides of the coupling leg portion 420, are provided approximately the same, one coupling gap may be the same as a value obtained by multiplying a thickness t of the support portion 100 by a tangent value of the adjustment threshold angle θ, as indicated in Equation 1 below.

$$g = t \times \tan\theta \qquad \text{Equation 1}$$

Here, g may be a coupling gap, t may be a thickness of the support portion 100, and θ may be an adjustment threshold angle θ.

Accordingly, as indicated in Equation 2 below, a size of the first coupling hole 110 may include an adjustment gap G on both sides of the second length d2. In other words, the size of the first coupling hole 110 may further include a gap at both sides of the second length d2, the gap is twice a value obtained by multiplying a tangent value of the adjustment threshold angle θ by the thickness t of the support portion 100.

$$d1 = d2 + 2 \times t \times \tan\theta \qquad \text{Equation 2}$$

Here, d1 may be a first length d1, d2 may be a second length d2, t may be a thickness of the support portion 100, and θ may be an adjustment threshold angle θ.

For example, when a second length d2 of the coupling leg portion 420 is 1 millimeter (mm), a maximum adjustment angle is 5 degrees (°), and a thickness t of the support portion 100 is 5 mm (where tan 5 is calculated as 0.1), a first length d1 of the first coupling hole 110 may be 2 mm.

Referring to FIG. 5 together with FIG. 1, the circuit board 200 of the optical lens 400 according to an example embodiment of the present disclosure may further include a second coupling hole 210 through which the coupling leg portion 420 may pass.

Here, the second coupling hole 210 may be aligned to approximately correspond to the first coupling hole 110, such that the circuit board 200 and the support portion 100 may be coupled to each other.

The module lamp 10 according to an example embodiment of the present disclosure may be adjusted in various directions in a state in which the coupling leg portion 420 of the optical lens 400 passes through the first coupling hole 110 or the first coupling hole 110 and the second coupling hole 210, and the coupling leg portion 420 may be fixed to the support portion 100 or the support portion 100 and the circuit board 200 using an adhesive A in a state in which the adjustment is completed.

Here, the adhesive A may be an epoxy adhesive, an ultraviolet (UV) curable adhesive, a silicone adhesive, a polyurethane adhesive, a cyanoacrylate adhesive, an acrylic adhesive, a hot melt adhesive, and the like.

An aiming operation may be required for a headlamp of a vehicle including a plurality of module lamps 10 to be oriented in a precise direction with relevant laws and optimal performance.

A module lamp 10 according to the related art may include a plurality of axis components for the aiming operation.

The module lamp 10 according to the related art was mechanically assembled. For example, respective module lamps were mechanically connected to each other by a clip or the like, and a rotation joint and an adjustment bolt were aligned with a base plate, and then vertical and horizontal aiming operations were performed.

In particular, in a headlamp including a plurality of module lamps 10 according to the related art, the number of module lamps 10 may increase, and accordingly a structure assisting in aiming may be added to complicate an overall structure and increase a weight, and an aiming operation may be performed on each module lamp 10, thereby increasing aiming operation time.

In addition, a structure used for aiming of the plurality of module lamps 10 according to the related art may include one-time components for aiming, and may not be used after being assembled to the headlamp.

Accordingly, an excessive number of components may be applied to the plurality of module lamps 10 according to the related art. However, due to a structure used for unnecessary aiming after assembly, a weight and a material cost may increase, and a space may be occupied, hindering a degree of design freedom of the head lamp.

In addition, the structure used for aiming of the plurality of module lamps 10 according to the related art had a nonlinear movement due to the center of an aiming rotation axis deviating from the light source 300, making it difficult to perform fine adjustment, and was a structure that is mechanically fixed and thus causes an aiming change due to external impacts.

Referring back to FIG. 5, the module lamp 10, according to an example embodiment of the present disclosure may perform an aiming operation by adjusting the optical lens 400 without an additional structure such as an adjustment bolt assisting in additional aiming, and may fix the optical lens 400 to the support portion 100 and the circuit board 200 using the adhesive A in a state in which aiming is completed.

Accordingly, the module lamp 10 according to an example embodiment of the present disclosure may minimize one-time components related to aiming to reduce a weight and a material cost of one-time components, and may minimize a gap between modules to improve a degree of design freedom. The module lamps may be disposed and arranged in various manners to develop a headlamp capable of irradiating various lights.

Here, the module lamp 10 according to an example embodiment of the present disclosure may perform an aiming operation of the optical lens 400 using a robot having a multi-degree of freedom.

For example, the robot having a multi-degree of freedom may be a multiaxial joint robot, and the multiaxial joint robot may grip the optical lens 400, and the coupling leg portion 420 of the optical lens 400 may be inserted into a coupling hole located on the support portion 100 and the circuit board 200.

The multiaxial joint robot may perform an aiming operation by adjusting a position and angle of the optical lens 400 in a state of gripping the optical lens 400, and may be fixed using the adhesive A in a state in which aiming is completed.

Here, the adhesive A may be coated on a rear surface of the support portion 100, more specifically, on an opposite surface of the support portion 100 in contact with the circuit board 200, through the coupling hole.

The coupling hole between the support portion 100 and the circuit board 200 may determine a first length d1 of the first coupling hole 110 so as to secure a sufficient space in which the adhesive A is to be filled.

In addition, a third length d3 of the second coupling hole 210 may be preferably set to be greater than the first length d1 of the first coupling hole 110, such that the adhesive A may be coated more smoothly between the circuit board 200 and the coupling leg portion 420.

Figure 6:
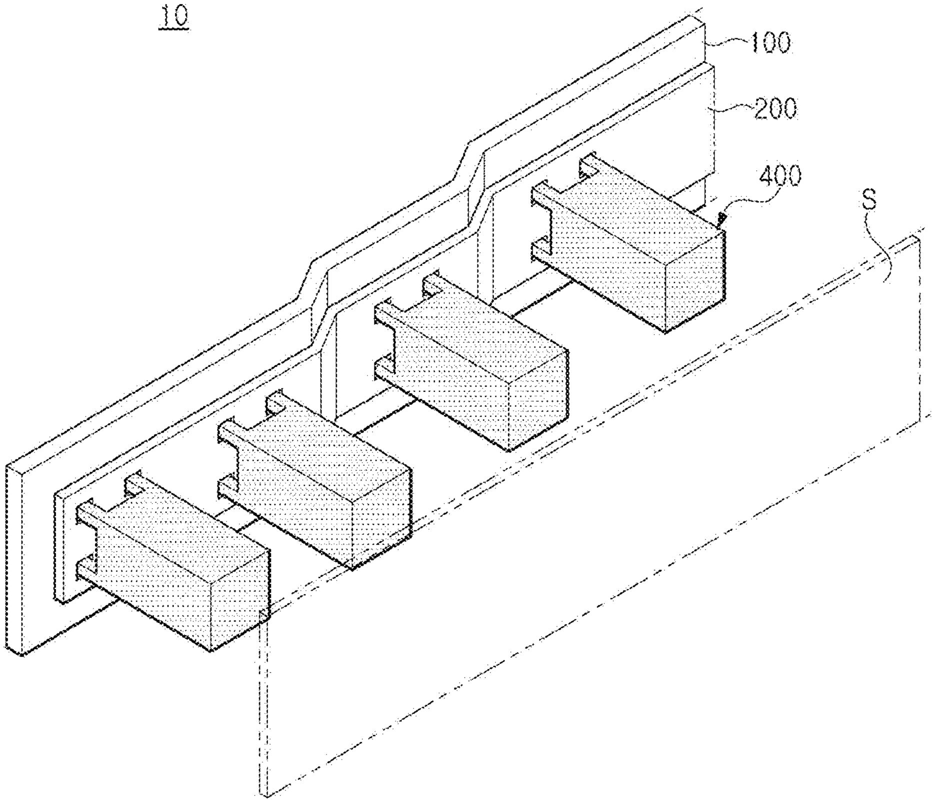
FIG. 6 is an exemplary view of a module lamp including a plurality of optical lenses and a light source irradiating a screen with light according to an example embodiment of the present disclosure.
Figure 7A:
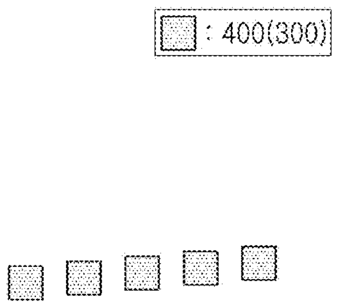
FIGS. 7A, 7B, 7C, 7D and 7E are an exemplary view of various arrangements of a module lamp according to an example embodiment of the present disclosure.
Figure 7B:
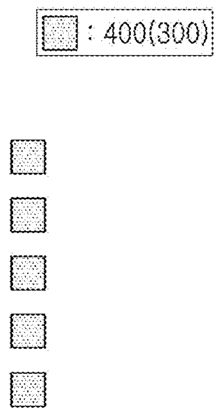
Figure 7C:
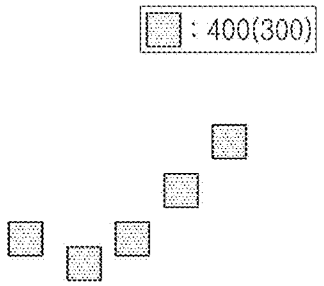
Figure 7D:
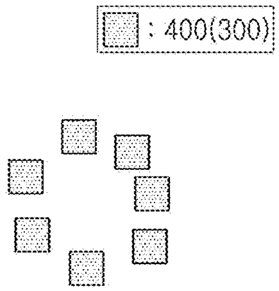
Figure 7E:
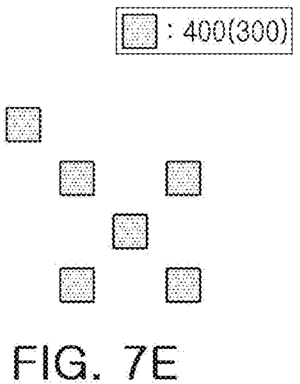

FIG. 6 is an exemplary view of a module lamp 10 including a plurality of optical lenses 400 and a light source 300 irradiating a screen S with light according to an example embodiment of the present disclosure. FIGS. 7A, 7B, 7C, 7D and 7E is an exemplary view of various arrangements of the module lamp 10 according to an example embodiment of the present disclosure.

Referring to FIG. 6, a module lamp 10 according to an example embodiment of the present disclosure may perform an aiming operation by adjusting the optical lens 400 while irradiating the screen S with light. The module lamp 10 according to an example embodiment of the present disclosure may perform an aiming operation and fixing operation using an adhesive A without having an aiming structure, and thus may have a high degree of design freedom, and a step portion between the module lamps 10 may be applied.

Here, when a step portion is present between the module lamps 10, a circuit board 200 may be divided and disposed according to arrangements of the light source 300 and the optical lens 400, or the flexible circuit board 200 may be applied.

As illustrated in FIGS. 7A, 7B, 7C, 7D and 7E, the module lamp 10 according to an example embodiment of the present disclosure may perform an aiming operation and fixing operation using the adhesive A without having an aiming structure, and thus various arrangements may be applied.

Figure 8:
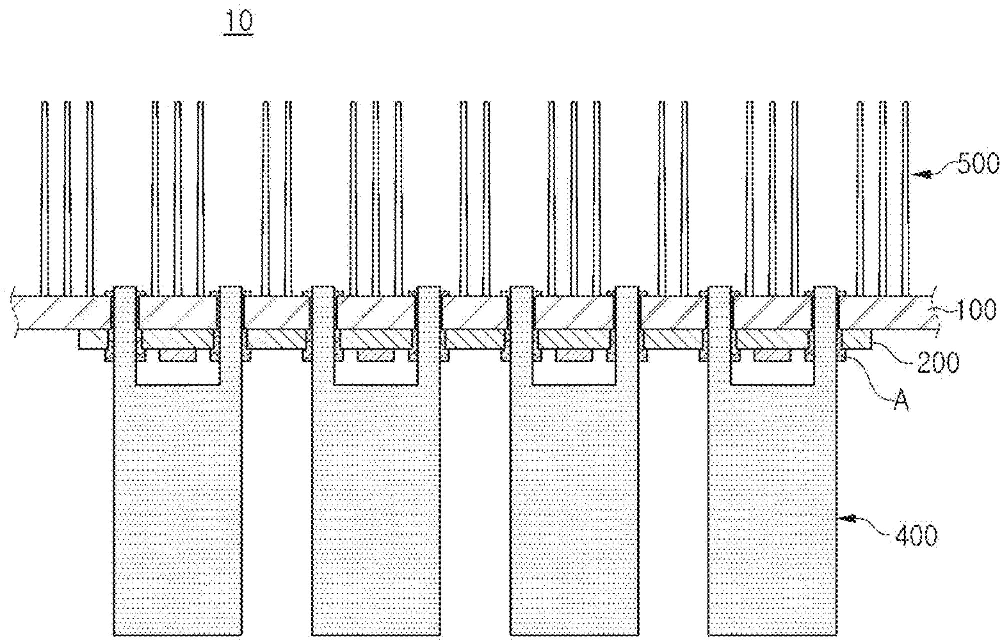
FIG. 8 is an exemplary view of a module lamp including a heat sink according to a second example embodiment of the present disclosure.

FIG. 8 is an exemplary view of a module lamp 10 including a heat sink according to a second example embodiment of the present disclosure.

A module lamp 10 according to second to sixth example embodiments of the present disclosure may use the support portion 100, the circuit board 200, the light source 300, and the optical lens 400 illustrated in FIGS. 1 to 5.

Accordingly, in describing the second to sixth example embodiments of the present disclosure with reference to FIGS. 8 to 12, descriptions overlapping descriptions of FIGS. 1 to 7 will be omitted below.

Referring to FIG. 8, in order to improve cooling performance, the support portion 100 of the module lamp 10 according to the second example embodiment of the present disclosure may further include a heat dissipation fin 120.

The heat dissipation fin 120 may be provided at a side opposite to a coupling surface between the support portion 100 and the circuit board 200.

In addition, the support portion 100 and the heat dissipation fin 120 may be formed of a material having excellent heat dissipation performance (for example, an aluminum alloy, a carbon nanotube composite, or the like).

Figure 9A:
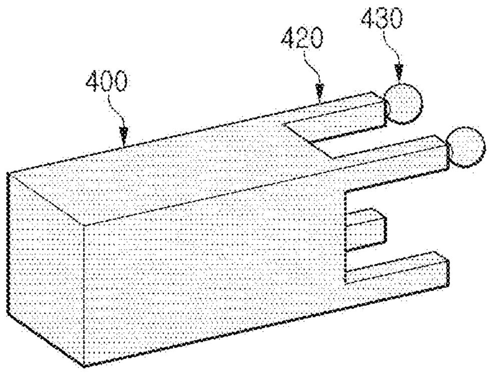
FIGS. 9A, 9B, and 9C are an exemplary view of a module lamp having a rotation coupling portion according to a third example embodiment of the present disclosure.
Figure 9B:
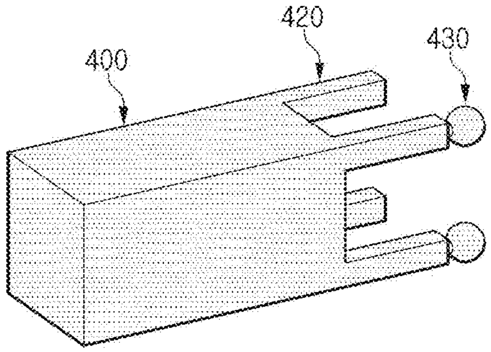
Figure 9C:
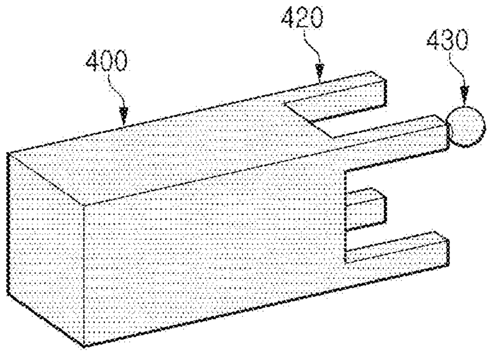

FIGS. 9A, 9B, and 9C are an exemplary view of a module lamp having a rotation coupling portion 421 according to a third example embodiment of the present disclosure.

In FIGS. 9A, 9B, and 9C, a module lamp 10 according to the third example embodiment of the present disclosure may further include a rotation coupling portion 421 of at least one coupling leg portion 420 rotatably connected to a support portion 100.

Here, the rotation coupling portion 421 may be a ball joint.

As illustrated in FIG. 9A, in order to form a horizontal axis, upper two coupling leg portions 420 may be connected to the support portion 100 through the rotation coupling portion 421, and lower two coupling leg portions 420 may be connected to the support portion 100 through an adhesive A after an aiming operation is performed.

As illustrated in FIG. 9B, in order to form a vertical axis, two coupling leg portions 420, provided on left-sided upper and lower portions, may be connected to the support portion 100 through the rotation coupling portion 421, and two coupling leg portions 420, provided on right-sided upper and lower portions, may be connected to the support portion 100 through the adhesive A after the aiming operation is performed.

As illustrated in FIG. 9C, one coupling leg portion 420 may be connected to the support portion 100 through the rotation coupling portion 421, and the other coupling leg portion 420 may be connected to the support portion 100 through the adhesive A after the aiming operation is performed.

The rotation coupling portion 421 may be provided on at least one coupling leg portion 420, thereby reducing a load of the coupling leg portion 420 fixed using the adhesive A, improving coupling force between the support portion 100 and the optical lens 400, and improving durability.

Figure 10:
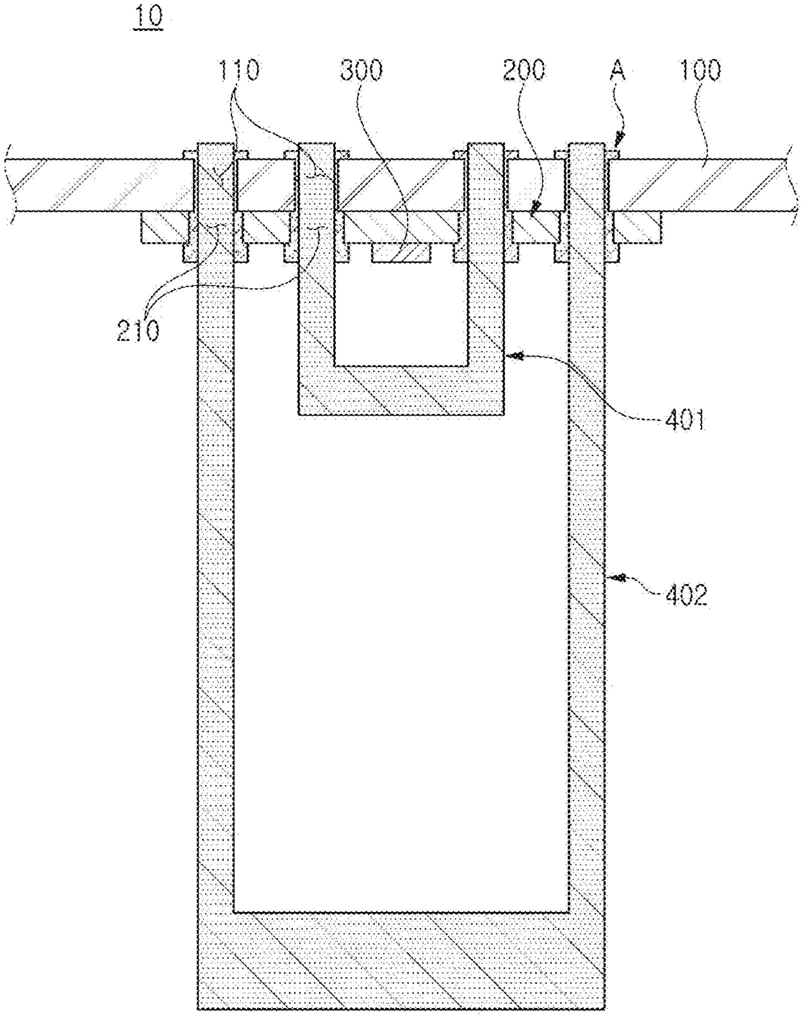
FIG. 10 is an exemplary view of a module lamp including a double optical lens according to a fourth example embodiment of the present disclosure.

FIG. 10 is an exemplary view of a module lamp 10 including a double optical lens 400 according to a fourth example embodiment of the present disclosure.

Referring to FIG. 10, a module lamp 10 according to a fourth example embodiment of the present disclosure may include two optical lenses 400.

Here, one optical lens 400 may be referred to as a first optical lens 401, and the other optical lens 400 may be referred to as a second optical lens 402.

Referring to FIG. 10, the first optical lens 401 and the second optical lens 402 may be disposed such that light emitted from the light source 300 passes through the first optical lens 401 and then is incident on the second optical lens 402.

Both the first optical lens 401 and the second optical lens 402 may include a coupling leg portion 420, and the coupling leg portion of the second optical lens 402 may be provided such that the first optical lens 401 is provided in a space formed by the second optical lens 402, a support portion 100, and a circuit board 200.

In other words, both the first optical lens 401 and the second optical lens 402 of the module lamp 10 according to the fourth example embodiment of the present disclosure may include the coupling leg portion 420, and the coupling leg portion 420 may be inserted into and fixed to a coupling hole between the support portion 100 and the circuit board 200.

Figure 11A:
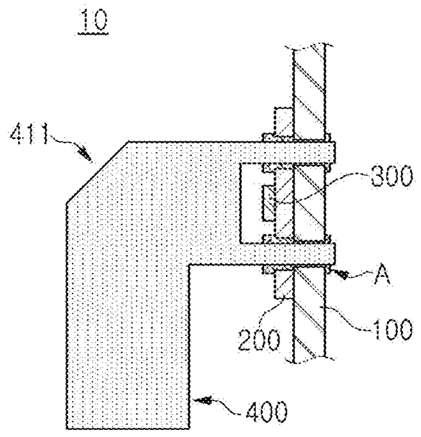
FIGS. 11A, 11B, and 11C are an exemplary view of a module lamp according to a fifth example embodiment of the present disclosure.
Figure 11B:
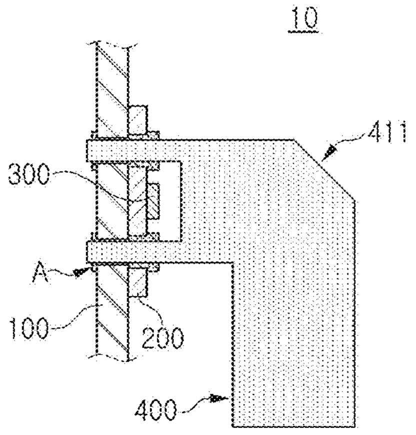
Figure 11C:
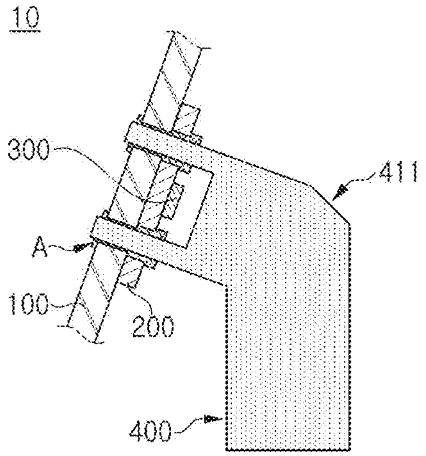

FIGS. 11A, 11B, and 11C are an exemplary view of a module lamp 10 according to a fifth example embodiment of the present disclosure.

Referring to FIGS. 11A, 11B, and 11C, an optical lens 400 included in a module lamp 10 according to the fifth example embodiment of the present disclosure may include a bent portion 411.

In addition, the module lamp 10 according to the fifth example embodiment of the present disclosure may include an optical lens 400 in a downward direction, as illustrated in FIG. 11A.

In addition, the module lamp 10 according to the fifth example embodiment of the present disclosure may include an optical lens 400 in an upward direction, as illustrated in FIG. 11B.

In addition, the module lamp 10 according to the fifth example embodiment of the present disclosure may be applied even when a support portion 100 is inclined, as illustrated in FIG. 11C.

In other words, the module lamp 10 according to the fifth example embodiment of the present disclosure may be applied regardless of a support direction of the support portion 100, and any lens including the coupling leg portion 420 may be applied regardless of a type of lens.

Figure 12:
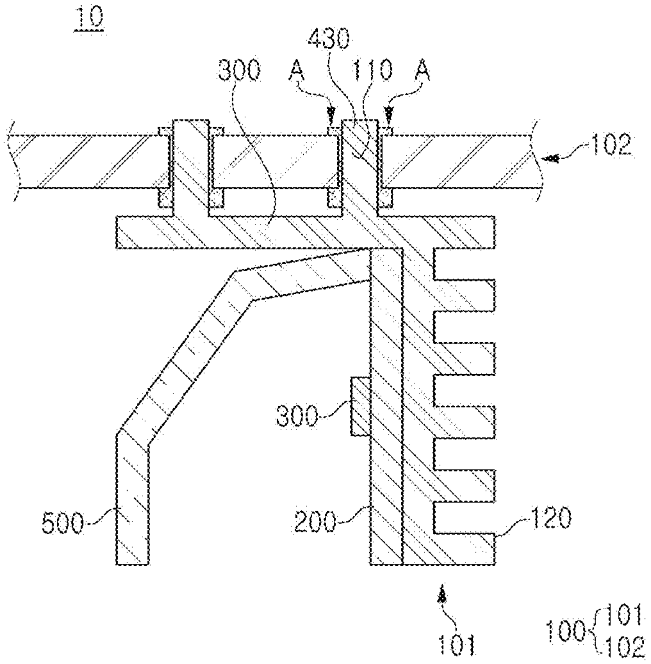
FIG. 12 is an exemplary view of a module lamp including a reflector according to a sixth example embodiment of the present disclosure.

FIG. 12 is an exemplary view of a module lamp 10 including a reflector according to a sixth example embodiment of the present disclosure.

Referring to FIG. 12, a module lamp 10 according to the sixth embodiment of the present disclosure may include a support portion 100, a circuit board 200, a light source 300, and a reflector 500.

The reflector 500 may be a plate reflecting light emitted from the light source 300 in a desired direction.

The reflector 500 may be formed of a material such as aluminum, plastic, glass, or the like, and may be reflectors having various structures such as a flat reflector, a curved reflector, and a polyhedral reflector.

The support portion 100 may have two support portions 100, and one support portion 100 may be referred to as a first support portion 101 and the other support portion 100 may be referred to as a second support portion 102.

The first support portion 101 may support the circuit board 200, the light source 300, and the support portion 100, and the second support portion 102 may support the first support portion 101.

The second support portion 102 may have a coupling hole, and the first support portion 101 may have the coupling leg portion 420.

The coupling leg portion 420 may be inserted into and fixed to the first coupling hole 110 of the second support portion 102.

As the coupling leg portion 420 is inserted into the first coupling hole 110 of the second support portion 102, the first support portion 101 may perform an aiming operation, and may be fixed using an adhesive A after the aiming operation is completed.

In addition, the first support portion 101 may further include a heat dissipation fin 120 to improve cooling performance.

In addition, the first support portion 101 and the heat dissipation fin 120 may be formed of a material having excellent heat dissipation performance (for example, an aluminum alloy, a carbon nanotube composite, or the like).

While example embodiments have been shown and described above, it will be apparent to those skilled in the art that modifications and variations could be made without departing from the scope of the present disclosure as defined by the appended claims.

The invention claimed is:

1. A module lamp comprising:
- a light source emitting light;
- a support portion supporting the light source;
- a circuit board positioned between the light source and the support portion; and
- an optical lens configured to allow light emitted from the light source to pass therethough;
- wherein the optical lens includes a coupling leg portion passing through the circuit board and the support portion;
- wherein each of the circuit board and the support portion has at least one coupling hole through which the coupling leg portion may pass;
- wherein a cross-section of the at least one coupling hole includes an adjustment gap, such that the cross-section of the at least one coupling hole is larger than a cross-section of the coupling leg portion;
- wherein the adjustment gap is determined based on an adjustment threshold angle of the optical lens; and
- wherein the threshold angle is a maximum inclination of the optical lens with respect to the support portion.

2. The module lamp of claim 1, wherein the at least one coupling hole includes a first coupling hole provided in the support portion.

3. The module lamp of claim 1, wherein the at least one coupling hole further includes a second coupling hole provided in the circuit board.

4. The module lamp of claim 1, wherein the optical lens and the light source are provided as a plurality of optical lenses and a plurality of light sources, and are connected to the support portion and the circuit board.

5. The module lamp of claim 1, wherein the circuit board is positioned on one surface of the support portion, and a heat dissipation fin is positioned on an other surface of the support portion.

6. The module lamp of claim 1, wherein the optical lens includes at least two optical lenses, and the at least two optical lenses include:

a first lens configured to adjust light emitted from the light source; and a second optical lens configured to adjust the light passing through the first lens.

7. A vehicle comprising:

a module lamp of claim 1.

8. The module lamp of claim 1, wherein the coupling leg portion has a rotation coupling portion rotatably connected to one of the support portion and the circuit board.

9. The module lamp of claim 1, wherein:

the optical lens includes a body portion configured to allow the light to be incident from one side of the optical lens, the body portion configured to emit the light to an other side of the optical lens; and the coupling leg portion is provided at the one side of the body portion and configured to support the body portion.

10. The module lamp of claim 9, wherein a portion of the body portion is bent at a predetermined angle.

* * * * *